US012312233B2

(12) United States Patent
Dudar (10) Patent No.: US 12,312,233 B2
(45) Date of Patent: May 27, 2025

(54) INTELLIGENT LIQUID LEVEL DISPLAY FOR AUXILIARY TANKS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 378 days.

(21) Appl. No.: 17/938,796

(22) Filed: Oct. 7, 2022

(65) Prior Publication Data
US 2024/0116745 A1    Apr. 11, 2024

(51) Int. Cl.
*B67D 7/22*       (2010.01)
*B60P 3/22*       (2006.01)
*G01F 23/20*      (2006.01)

(52) U.S. Cl.
CPC .......... *B67D 7/221* (2013.01); *B60P 3/2205* (2013.01); *G01F 23/20* (2013.01)

(58) Field of Classification Search
CPC ....... B67D 7/221; B60P 3/2205; G01F 23/20; B60K 15/03
See application file for complete search history.

(56) References Cited

U.S. PATENT DOCUMENTS

| | | | |
|---|---|---|---|
| 6,002,328 A | 12/1999 | Wallrafen | |
| 6,405,744 B1 | 6/2002 | Lapant | |
| 6,439,473 B1 * | 8/2002 | Meyer | G01G 19/38 239/69 |
| 7,940,165 B1 * | 5/2011 | Oxley | B60K 15/03006 340/450 |
| 9,000,905 B2 * | 4/2015 | Oxley | F02D 19/027 340/450 |
| 2011/0226362 A1 * | 9/2011 | Oxley | B60Q 1/543 137/572 |

FOREIGN PATENT DOCUMENTS

| | | |
|---|---|---|
| CN | 205706157 U | 11/2016 |
| CN | 211054929 U | 7/2020 |

OTHER PUBLICATIONS

Tanker Truck Monitoring, The Wayback Machine, Aug. 6, 2020, 1-9.

* cited by examiner

*Primary Examiner* — Manuel A Rivera Vargas
(74) *Attorney, Agent, or Firm* — Emily Drake; Eversheds Sutherland (US) LLP (57) ABSTRACT

A system to display liquid levels in vehicle auxiliary tanks is disclosed. The vehicle includes a plurality of auxiliary tanks disposed on a vehicle cargo bed. The vehicle further includes a first detection unit to detect a user activity associated with the plurality of auxiliary tanks, and a second detection unit to measure a vehicle weight. The vehicle further includes a control unit to identify a first auxiliary tank, from the plurality of auxiliary tanks, which is associated with the user activity. The control unit further determines a vehicle weight change based on the measurement of weight and an initial vehicle weight. In addition, the control unit correlates first auxiliary tank identification and weight change determination, and calculates a liquid level change associated with the first auxiliary tank. Responsive to the calculation, the control unit displays the liquid level change on a user interface.

18 Claims, 5 Drawing Sheets

INTELLIGENT LIQUID LEVEL DISPLAY FOR AUXILIARY TANKS

TECHNICAL FIELD

The present disclosure relates to a system and method for displaying liquid level in tanks, and more particularly, to a method and system for measuring and displaying liquid level in auxiliary tanks disposed on a vehicle.

BACKGROUND

An auxiliary liquid tank is an additional container that may be disposed on a vehicle to supplement vehicle's liquid carrying capability. The auxiliary liquid tank may store fuel (e.g., diesel or gasoline), lubricating oil, engine oil, fertilizer or weed killer, potable water, and/or the like. The auxiliary liquid tank may supply fuel to vehicle engine or may supply fuel (and other liquids) to factory fitted tanks. Auxiliary liquid tanks are generally used in commercial vehicles and are helpful in saving vehicle operator's time and effort in refueling the vehicle.

Typically, a vehicle's factory-fitted fuel tank includes float level indicators that allow determination of liquid level in the fuel tank. However, auxiliary liquid tanks may not detect liquid level inside the auxiliary liquid tanks.

Conventional means to detect the auxiliary tank liquid level includes the use of dipstick or sight glass. However, the conventional means may not be convenient and accurate. Conventional auxiliary liquid tank systems on-board most vehicles do not include a way to detect the auxiliary tank liquid level. Vehicle operators may not know that the vehicle is running low on a certain type of liquid (such as fuel or water) in the auxiliary liquid tank. In addition, the vehicle operator may overfill or under fill the auxiliary tank, as the vehicle operator may not have an indication of auxiliary tank liquid level.

Thus, there exists a need in the industry for an enhanced system and method for determining liquid level in the auxiliary liquid tanks, and displaying the liquid level on a Human-Machine Interface (HMI).

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed towards a vehicle for displaying a liquid level of an auxiliary tank on a Human-Machine Interface (HMI). The vehicle may include a plurality of auxiliary tanks that may be disposed on a vehicle cargo bed. A vehicle operator may add or dispense liquid from each auxiliary tank. A vehicle camera may capture a vehicle operator (or any other person's) activity in an auxiliary tank proximity, e.g., when the vehicle operator adds liquid to a specific auxiliary tank (e.g., a first auxiliary tank). The vehicle camera may send the captured images/videos to a vehicle processor. The vehicle processor may process the vehicle operator activity images/videos, and determine the first auxiliary tank, from the plurality of auxiliary liquid tanks, in which the vehicle operator may be filling the liquid. The vehicle processor may further determine a type of liquid that the vehicle operator may be filling, and a vehicle weight increase corresponding to the liquid filing. The vehicle processor may further correlate the vehicle weight increase with a liquid type density associated with the determined liquid type, and determine a liquid level increase in the first auxiliary tank. The vehicle processor may further cause the HMI to display the liquid level increase corresponding to the first auxiliary tank.

In some aspects, the vehicle processor may determine the liquid type by determining a color of a liquid dispenser nozzle that the vehicle operator may use to fill the first auxiliary tank. In this case, a vehicle memory may store a mapping of a plurality of liquid dispenser nozzle colors with corresponding liquid types, and the vehicle processor may use the mapping to determine the liquid type that the vehicle operator may be filling. In some aspects, the vehicle processor may determine the liquid dispenser nozzle color from the vehicle operator activity images/videos captured by the vehicle camera. In further aspects, the vehicle processor may identify the first auxiliary tank based on the determined liquid type.

In some aspects, the plurality of auxiliary tanks may store gasoline, water, lubricating oil, engine oil, and/or the like. Further, the vehicle may include weight sensors that may determine the vehicle weight increase and send the vehicle weight increase information to the vehicle processor.

The present disclosure discloses a system to determine and display liquid levels in vehicle auxiliary tanks. The system functions by using existing vehicle components, and no additional/external components (e.g., dipsticks or sight glasses) are required. Further, the system enables the vehicle operator to conveniently check the liquid level in auxiliary tanks, and take remedial actions (e.g. refill liquid) when the liquid level reduces. In addition, the present disclosure provides an accurate measurement of auxiliary tank liquid level, and may not require human intervention.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1:
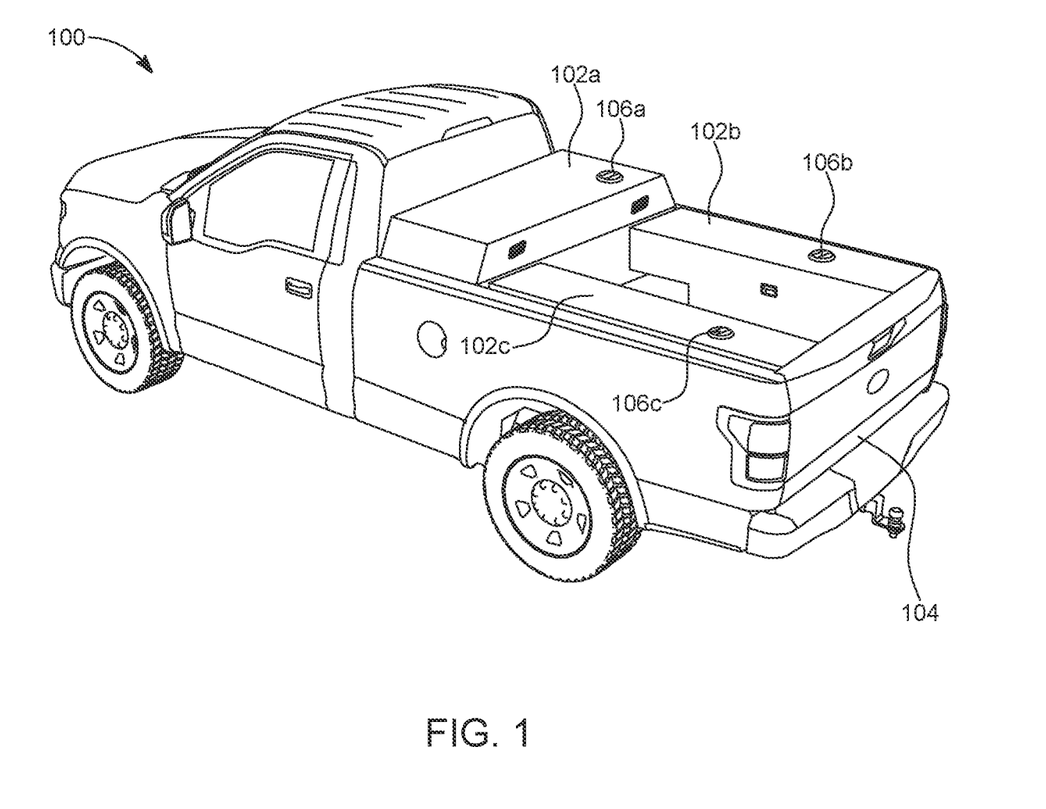
FIG. 1 depicts an example vehicle in which techniques and structures for providing the systems and methods disclosed herein may be implemented.

FIG. 1 depicts an example vehicle 100 in which techniques and structures for providing the systems and methods disclosed herein may be implemented. The vehicle 100 may include, but not limited to, a truck (including long-haul trucks), a van (including walk-in vans), a truck trailer, off-road vehicles, construction equipment (such as bulldozers and excavators), and/or the like. In some aspects, the vehicle 100 may be an autonomous vehicle. In other aspects, a driver/operator (not shown) may operate the vehicle 100.

The vehicle 100 may include a main fuel tank, such as a factory-installed fuel tank (not shown in FIG. 1). The vehicle 100 may store specific gallons of fuel in the main fuel tank, which may vary from vehicle-to-vehicle based on fuel tank storage capacity. The main fuel tank may store gasoline or diesel, which may facilitate the vehicle operation (e.g., vehicle movement).

The vehicle 100 may further include a plurality of auxiliary tanks 102a, 102b, and 102c (or auxiliary tanks 102), in addition to the main fuel tank. The auxiliary tanks 102 may be auxiliary liquid tanks that may supplement the main fuel tank storage capacity (which may be fixed or limited). In other words, the auxiliary tanks 102 may increase the vehicle's capacity to carry more fuel in the vehicle 100, which may allow the vehicle 100 to travel long distances without stopping for refueling. In some aspects, the auxiliary tanks 102 may also act as fuel backup, in case of emergencies. The auxiliary tanks 102 may be configured to supply fuel to vehicle engine or to the main fuel tank.

The auxiliary tanks 102 may be further configured to store other liquids, for example, lubricating oil, engine oil, fertilizer or weed killer, potable water, and/or the like. For instance, the auxiliary tank 102a may be configured to store additional fuel (to act as fuel back-up), the auxiliary tank 102b may be configured to store potable water, and the auxiliary tank 102c may be configured to store other liquids such as engine oil or lubricating oil that may be required during the vehicle travel. In further aspects, the auxiliary tanks 102 may be configured to store material in other two states of matter. For instance, the auxiliary tanks 102 may store material in solid state or in gaseous state (such as natural gas). In the case of solid state, the auxiliary tanks 102 may be, for example, foam insulation tanks.

In some aspects, the auxiliary tanks 102 may be portable and may be moved inside the vehicle 100 when required. In other aspects, the auxiliary tanks 102 may be permanently affixed to the vehicle 100, for example, to a vehicle's cargo bed 104. Further, the auxiliary tanks 102 may be of any size based on vehicle type and available cargo space, and thus may have different capacities. In one or more aspects, the auxiliary tanks 102 may be rectangular, square, or of any other shape. Furthermore, the auxiliary tank 102 may be made of steel, aluminum, or polyethylene.

In further aspects, the auxiliary tanks 102 may include one or more means to receive or dispense fuel (or other liquids) stored in the auxiliary tanks 102. For example, the auxiliary tanks 102 may include fill caps 106a, 106b, 106c (or fill caps 106) through which the vehicle operator may add liquid in the auxiliary tanks 102. The auxiliary tanks 102 may further include outlets (not shown) to dispense the liquid from the auxiliary tanks 102.

In accordance with some aspects, the vehicle 100 may be configured to detect a vehicle operator activity associated with the auxiliary tanks 102. For instance, when the vehicle operator refills an auxiliary tank through the fill caps 106, the vehicle 100 may identify whether the vehicle operator is refiling the auxiliary tank 102a, 102b or 102c. In other words, the vehicle 100 may be configured to identify the auxiliary tank, from the auxiliary tanks 102, in which the vehicle operator may be refilling the liquid. Similarly, the vehicle 100 may be configured to identify the auxiliary tank through which the liquid is dispensed, when the vehicle operator extracts the liquid from the auxiliary tank.

In some aspects, the vehicle 100 may identify the auxiliary tank by detecting a dispenser nozzle type that the vehicle operator may use to refill the auxiliary tank. In this case, the vehicle operator may use different dispenser nozzle types (e.g., nozzles of different colors, which may be used for different fuel/liquid types) to refill different auxiliary tanks. For example, the vehicle operator may use a red-colored nozzle to refill gasoline in the auxiliary tank 102a, a yellow-colored nozzle to refill ethanol in the auxiliary tank 102b, and a green-colored nozzle to refill diesel in the auxiliary tank 102c. In this case, the vehicle 100 may detect, via a vehicle camera (not shown), the dispenser nozzle color that the vehicle operator is using to refill the auxiliary tank, and may determine the fuel/liquid type based on the dispenser nozzle color. In further aspects, the vehicle 100 may determine auxiliary tank based on the determined fuel type. In this aspect, the vehicle 100 may store a mapping of dispenser nozzle colors/fuel types with corresponding auxiliary tanks in a vehicle memory (not shown), and may use the mapping to determine the auxiliary tank in which the vehicle operator may be refilling the liquid. In other words, the vehicle memory may include mapping of auxiliary tanks 102 and their corresponding liquid/fuel.

In further aspects, the vehicle 100 may identify the auxiliary tank by detecting a location of vehicle operator activity, when the vehicle operator refills (or extracts) liquid in the tank. In particular, the vehicle 100 may store (in the vehicle memory) auxiliary tank locations in the cargo bed 104, and may correlate the auxiliary tank locations with the vehicle operator activity location to determine the auxiliary tank. For example, if the auxiliary tank 102a is placed on a cargo bed right side and the vehicle 100 detects (through the vehicle camera) that the vehicle operator's activity is in the cargo bed right side, the vehicle 100 may determine that the vehicle operator is refilling (or extracting) liquid in the auxiliary tank 102a. In addition, the vehicle 100 may determine the corresponding fuel/liquid type that may be stored in the auxiliary tank 102a, via the mapping stored in the vehicle memory.

In further aspects, the vehicle 100 may be configured to measure weight in the cargo bed 104. For example, the vehicle 100 may be configured to measure a weight change (addition or reduction) in the cargo bed 104 when the vehicle operator refills or extracts liquid from the auxiliary tanks 102.

The vehicle 100 may be further configured to correlate the auxiliary tank identification, the liquid type determination, and the weight change in the cargo bed 104 to determine a liquid level change in the auxiliary tank during the liquid refilling (or extracting) process. In this case, the vehicle 100 may use liquid density information (for the determined liquid type) and auxiliary tank size/capacity information (stored in the vehicle memory) to determine the liquid level change corresponding to the weight change in the cargo bed 104. The vehicle 100 may be further configured to display the auxiliary tank liquid level on a vehicle Human-Machine Interface (HMI) (not shown in FIG. 1).

Figure 2:
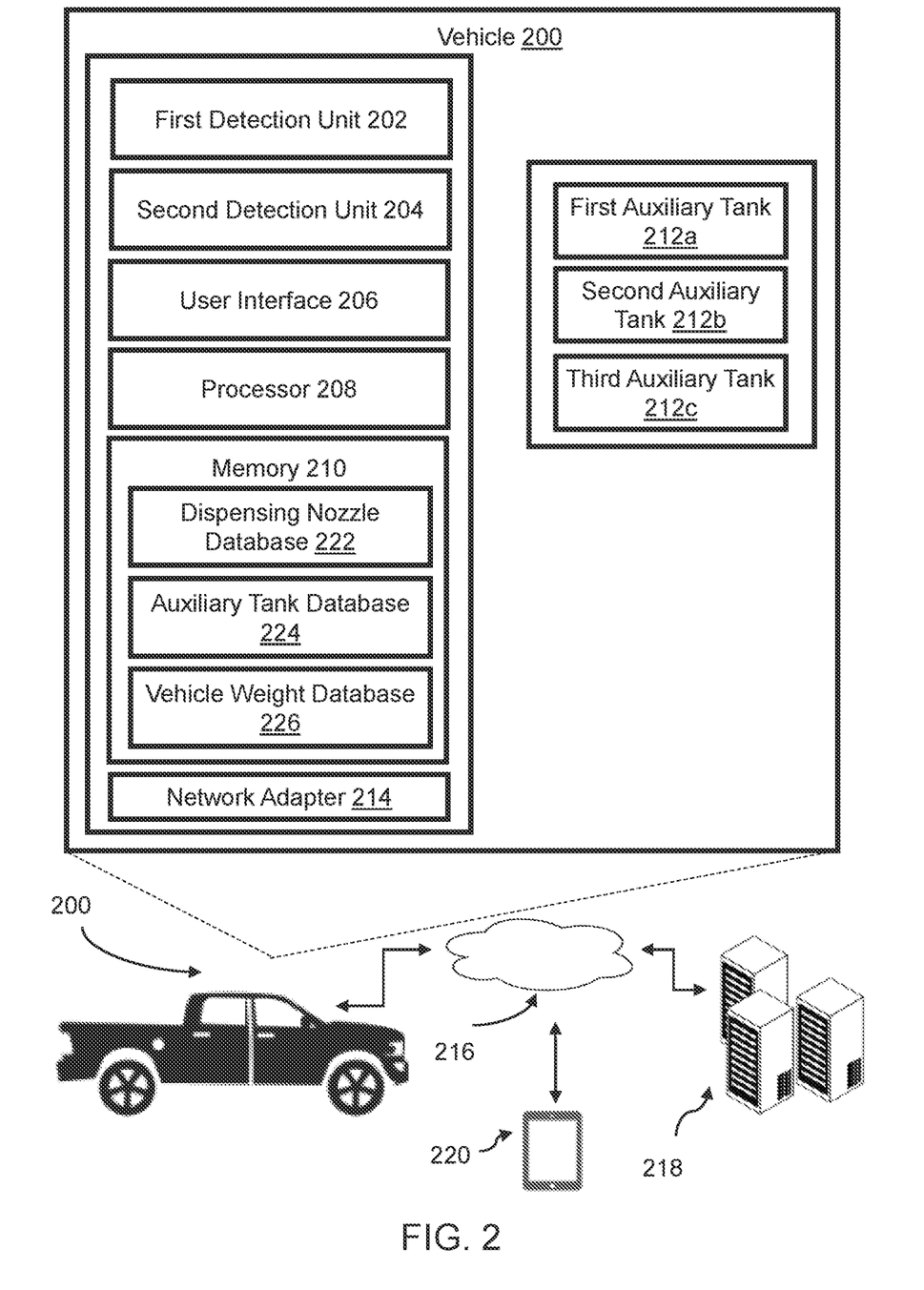
FIG. 2 illustrates a block diagram of an example vehicle for determining liquid level in auxiliary tanks in accordance with the present disclosure.

FIG. 2 illustrates a block diagram of an example vehicle 200 for determining a liquid level in auxiliary tanks in accordance with the present disclosure. The vehicle 200 may include a first detection unit 202, a second detection unit 204, a user interface 206, one or more processor(s) 208 (or a processor 208, or a control unit), and a memory 210, and, which may communicatively couple with each other. In some aspects, the vehicle 200 may be same as the vehicle 100, and may further include a plurality of auxiliary tanks 212a, 212b, and 212c (or auxiliary tanks 212).

Furthermore, the vehicle 200 may include one or more network communication adapter(s) 214 (or a network adaptor 214) enabled to communicatively connect the vehicle 200 with one or more networks 216. In some aspects, the network(s) 216 can be and/or include Internet protocol (IP)-based network(s) for communication between the vehicle 200 and one or more server(s) 218 and/or a user device 220 (or any other external device). The user device 220 may be, for example, a user device associated with a vehicle operator (not shown). Further, the one or more server(s) 218 may be part of a cloud-based computing infrastructure and may be associated with and/or include a Telematics Service Delivery Network (SDN) that provides digital data services to the vehicle 200.

The network(s) 216 may transmit and receive data between the vehicle 200, the server(s) 218, and the user device 220. In one or more aspects, the network(s) 216 can be a managed IP network administered by a service provider. The network(s) 216 can be implemented in a wireless fashion, e.g., using wireless protocols and technologies, such as Wi-Fi, WiMAX, etc. The network(s) 216 can also connect with and/or include a wired network, e.g., an Ethernet network, a controller area network (CAN), etc., having any wired connectivity including, e.g., an RS232 connection, etc. The network(s) 216 can also be and/or include a packet-switched network such as a local area network, wide area network, metropolitan area network, the Internet, or other similar type of network environment. The network(s) 216 can be a fixed wireless network, a wireless local area network (LAN), a wireless wide area network (WAN), a personal area network (PAN), a virtual private network (VPN), intranet or another suitable network system.

In some aspects, the processor 208 may be a hardware device for executing program instructions (aka software), stored in a computer-readable memory (e.g., the memory 210). The processor 208 may be disposed in communication with one or more memory devices (e.g., the memory 210 and/or one or more external database(s), etc.).

The memory 210 can include any one or a combination of volatile memory elements (e.g., dynamic random-access memory (DRAM), synchronous dynamic random access memory (SDRAM), etc.) and can include any one or more nonvolatile memory elements (e.g., erasable programmable read only memory (EPROM), flash memory, electronically erasable programmable read only memory (EEPROM), programmable read only memory (PROM), etc.

In some aspects, the memory 210 may include one or more databases, such as a dispenser nozzle database 222, an auxiliary tank database 224, and a vehicle weight database 226. The dispenser nozzle database 222 may store information associated with different dispenser nozzles that the vehicle operator may use to refill the auxiliary tanks 212. For instance, the dispenser nozzle database 222 may include colors for different dispenser nozzles corresponding to different fuel types. For example, a red nozzle may correspond to gasoline, a yellow nozzle may correspond to ethanol, a green nozzle may correspond to diesel, and/or the like. In some aspects, the vehicle 200 may receive the dispenser nozzle information from the server(s) 218, or the vehicle operator via the user device 220 and/or the user interface 206. Responsive to receiving the information, the vehicle 200 may send the information to the memory 210 to store in the dispenser nozzle database 222.

In further aspects, the auxiliary tank database 224 may store information associated with the auxiliary tanks 102. For instance, the auxiliary tank database 224 may store information associated with size/capacity of each auxiliary tank 212 placed on the vehicle 100, a type of liquid present in each auxiliary tank (e.g., auxiliary tank 212a may store gasoline, auxiliary tank 212b may store potable water, and/or the like), a tank location of each auxiliary tank in a vehicle cargo bed, and information associated with liquid level in each auxiliary tank. In some aspects, the memory 210 may be configured to dynamically update the information stored in the auxiliary tank database 224 (such as when a liquid level in an auxiliary tank increases or decreases).

In some aspects, the vehicle operator may provide inputs/information associated with the auxiliary tanks 212 to the vehicle 200 via the user interface 206 and/or the user device 220. Responsive to receiving the auxiliary tank information, the vehicle 200 may send the information to the memory 210 to store in the auxiliary tank database 224. For instance, the vehicle operator may provide the auxiliary tank 212a information to the vehicle 200, via the user interface 206. For example, the vehicle operator may input that the auxiliary tank 212a may store gasoline, has a capacity of 40 pounds, and may be placed on a vehicle cargo bed right side. In other aspects, the vehicle operator may use a Quick-Response (QR) code disposed on the auxiliary tanks to fetch auxiliary tank information, and send the information to the vehicle 200. For example, the vehicle operator may use a QR code scanner to fetch auxiliary tank information, and may transmit the information to the vehicle 200 via the user device 220 or the QR code scanner. In some aspects, the QR code scanner may be a vehicle component. In other aspects, the QR code scanner may be a separate component/apparatus that the vehicle operator may use to fetch the auxiliary tank information.

The memory 210 may further store a vehicle weight information in the vehicle weight database 226. For instance, the vehicle weight database 226 may store a vehicle fixed weight (e.g., vehicle components' weight), a vehicle operator and/or a vehicle passenger weight. In addition, the vehicle weight database 226 may temporarily store a vehicle weight increase/decrease, for example, when the vehicle operator or the vehicle passenger enters or exits the vehicle 200, or when the vehicle operator fills or extracts liquid from the vehicle main fuel tank and/or the auxiliary tanks 212.

In some aspects, the first detection unit 202 may be configured to detect vehicle operator activity associated with the auxiliary tanks 212, for example, when the vehicle operator fills or extracts liquid from the auxiliary tanks 212. The first detection unit 202 may include, but is not limited to, one or more vehicle cameras, a microphone, a proximity sensor, and/or the like. In some aspects, the vehicle cameras may be located anywhere in the vehicle 100, with a line of sight aligned to the vehicle cargo bed (and particularly to the auxiliary tanks 212). For instance, the vehicle cameras may be installed at a rear top of a vehicle cab that may enable capture of vehicle cargo bed images and/or videos.

In some aspects, the first detection unit 202 may be configured to capture vehicle operator activity images and/or videos in an auxiliary tank proximity, and may transmit the captured images/videos to the processor 208. For example, the vehicle cameras may capture and transmit the vehicle operator images, when the vehicle operator fills the liquid in the auxiliary tanks 212. In additional aspects, the first detection unit 202 may send the captured images/videos to the memory 210, for storage purpose.

In further aspects, the second detection unit 204 may be configured to detect/measure vehicle weight. For example, the second detection unit 204 may include a weight scale, a weight sensor, and/or the like, installed on the vehicle 200 (e.g., on the vehicle cargo bed). In some aspects, the vehicle 200 may include weight sensors on all four vehicle corners. In some aspects, the second detection unit 204 may be configured to transmit the measured vehicle weight to the vehicle weight database 226 and the processor 208. In one or more aspects, the second detection unit 204 may transmit the measured vehicle weight to the processor 208 based on predefined trigger events.

In some aspects, the predefined trigger events may include, for example, an event when the processor 208 detects the vehicle operator activity in the auxiliary tank proximity. In this case, the processor 208 may send a command to the second detection unit 204 to fetch the vehicle weight. Responsive to receiving the command from the processor 208, the second detection unit 204 may send the vehicle weight to the processor 208. In other aspects, the predefined trigger event may include the processor 208 receiving an auxiliary tank refilling notification/input from the vehicle operator, via the user interface 206 or the user device 220. In this case, the vehicle operator may send the auxiliary tank refilling notification/input to the processor 208, and indicate to the processor 208 that the vehicle operator may fill the auxiliary tank 212a, 212b or 212c (and/or a liquid type). Responsive to receiving the notification/input from the vehicle operator, the processor 208 may send the command to the second detection unit 204 to fetch the vehicle weight.

Although the description above describes an aspect where the processor 208 may send the command to the second detection unit 204 to fetch the vehicle weight based on the detected vehicle operator activity, in other aspects, the processor 208 may activate the first detection unit 202 based on the vehicle weight received from the second detection unit 204. In this case, the second detection unit 204 may send the vehicle weight to the processor 208 at a predefined frequency, and when the processor 208 determines an increase or decrease in the vehicle weight, the processor may activate the first detection unit 202 to capture the vehicle operator activity.

In some aspects, the processor 208 may obtain the vehicle weight from the second detection unit 204, as described above. In other aspects, the processor 208 may obtain the vehicle weight from the vehicle weight database 226.

In a similar manner, the processor 208 may be configured to obtain the vehicle operator activity images associated with the auxiliary tanks 212 from the first detection unit 202 or from the memory 210. In some aspects, the processor 208 may be configured to process the obtained images and determine whether the vehicle operator activity is associated with the auxiliary tank 212a, 212b or 212c. For instance, the processor 208 may determine that the vehicle operator may be filling liquid in the auxiliary tank 212a, when the processor 208 detects, from the obtained images that the vehicle operator activity is in the auxiliary tank 212a proximity.

In accordance with further aspects, the processor 208 may be configured to obtain the vehicle operator activity images from the first detection unit 202 (or from the memory 210), and process the images to detect a dispenser nozzle color that the vehicle operator may be using to fill the liquid in the auxiliary tank 212a, 212b or 212c. Responsive to determining the dispenser nozzle color, the processor 208 may determine whether the vehicle operator is filling liquid in the auxiliary tank 212a, 212b or 212c.

As described above, the dispenser nozzle color may be different for different fuels. For instance, a gasoline dispenser nozzle may be red in color, an ethanol dispenser nozzle may be yellow, and a diesel dispenser nozzle may be green. Responsive to determining the nozzle color that the vehicle operator uses for filling the auxiliary tank 212a, 212b or 212c, the processor 208 may determine a fuel type that the vehicle operator is filling. Furthermore, the processor 208 may fetch liquid type information for each auxiliary tank from the auxiliary tank database 224, and may determine the auxiliary tank corresponding to the fuel type that the vehicle operator may be filling. For example, if the processor 208 determines that the vehicle operator is filling gasoline (from the nozzle color), and the auxiliary tank 212a stores gasoline, the processor 208 may determine that the vehicle operator may be filling liquid in the auxiliary tank 212a.

A person ordinarily skilled in the art may appreciate that the processor 208 determines the auxiliary tank by using existing vehicle components (e.g., vehicle cameras), and may not require external components/apparatuses to determine the tank that the vehicle operator may be filling. Thus, the present disclosure provides an advantage that the vehicle operator may not be required to install external components to determine the auxiliary tank that is being filled during the refilling process.

In accordance with further aspects, the processor 208 may be configured to receive/obtain the measured weight from the second detection unit 204. Responsive to receiving the measured weight, the processor 208 may be configured to determine a weight that is increased in the vehicle 200, for example, when the vehicle operator refills the auxiliary tanks 212a, 212b or 212c. In other words, the processor 208 may be configured to determine the liquid weight that the vehicle operator may add to the auxiliary tanks 212a, 212b or 212c. For instance, the processor 208 may subtract a collective initial vehicle weight (e.g., the vehicle fixed weight, the vehicle operator weight, and/or a vehicle passenger weight) from the measured weight, and determine the added liquid weight. In some aspects, the processor 208 may obtain the collective initial vehicle weight from the vehicle weight database 226.

In one or more additional aspects, the processor 208 may instruct the vehicle operator, via the user interface 206 or the user device 220, to calibrate the second detection unit 204 (e.g., the weight scale) before or when the vehicle operator fills the liquid in the auxiliary tank 212a, 212b or 212c. For example, the processor 208 may instruct the vehicle operator to turn the weight scale to "zero" before the vehicle operator fills the liquid. The vehicle operator may turn the weight scale to zero by pressing/clicking a dedicated actuator (not shown) on the vehicle 200 or by sending instructions to the second detection unit 204 via the user interface 206 or the user device 220. Responsive to receiving the instructions from the vehicle operator, the second detection unit 204 may turn the scale to zero. The vehicle operator may then fill the liquid in the auxiliary tank 212a, 212b or 212c, and the processor 208 may determine the weight change due to the liquid weight. In this case, the processor 208 may not subtract the collective initial vehicle weight from the weight measured by the second detection unit 204, as the weight scale may be calibrated to zero before the vehicle operator starts to fill the liquid in the auxiliary tank 212a, 212b or 212c.

In accordance with further aspects, the processor 208 may be configured to correlate the auxiliary tank identification (identified via the images captured by the first detection unit 202), the liquid type determination and the weight change determination (determined via the second detection unit 204). Responsive to correlating, the processor 208 may determine a change in a liquid level in the identified auxiliary tank, for example, by using a liquid density information (stored in the memory 210). The process of determining the change in the liquid level may be understood in conjunction with FIGS. 3 and 4.

In further aspects, the processor 208 may be display the determined liquid level to the vehicle operator via the user interface 206 or the user device 220. The display details may be understood in conjunction with FIG. 4.

Figure 3:
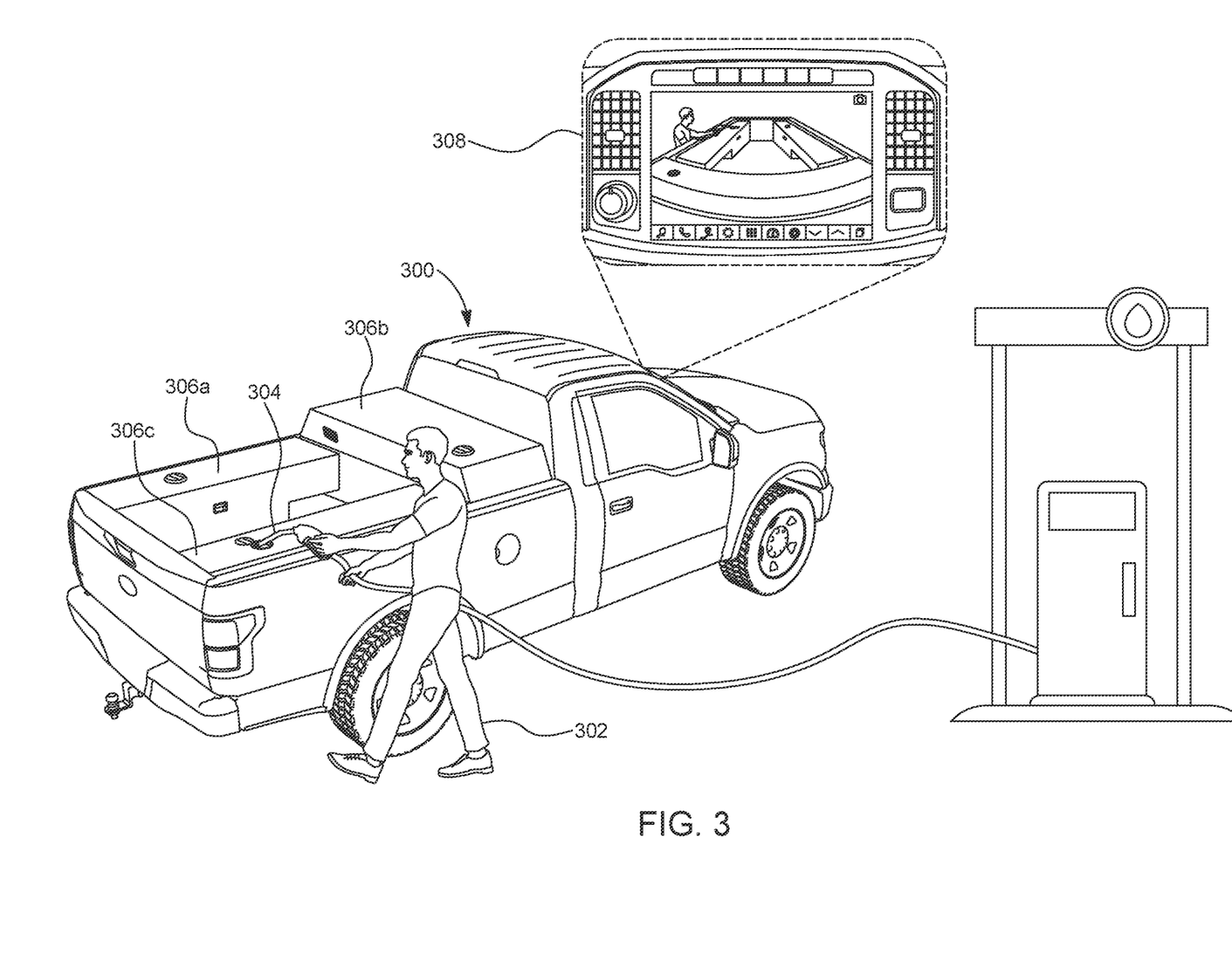
FIG. 3 depicts an example embodiment to determine a target auxiliary tank and/or liquid type, in accordance with the present disclosure.

FIG. 3 depicts an example embodiment to determine a target auxiliary tank and/or fuel type, in accordance with the present disclosure. In particular, FIG. 3 depicts a vehicle operator 302 refueling a vehicle 300, via a dispenser nozzle 304. The vehicle 300 may include a plurality of auxiliary tanks 306a, 306b, and 306c.

In some aspects, the vehicle 300 may be same as the vehicle 200, and the plurality of auxiliary tanks 306a, 306b, and 306c (or auxiliary tanks 306) may be same as the plurality of auxiliary tanks 212a, 212b, and 212c.

In some aspects, the processor 208 may activate the first detection unit 202 to capture vehicle operator activity proximate to the auxiliary tanks 306, when the processor 208 determines the weight change in the vehicle 300 (as described in conjunction with FIG. 2). For instance, the processor 208 may activate vehicle cargo bed cameras and/or other exterior cameras (side view camera, 360 degree view camera, and/or the like) to capture vehicle operator activity images/videos, when the processor 208 receives the weight change information from a vehicle on-board weight scale (the second detection unit 204). In some aspects, the processor 208 may obtain the captured images/videos from the vehicle cargo bed cameras, and display the vehicle operator activity on a vehicle infotainment system 308, as shown in FIG. 3.

In further aspects, the processor 208 may process the obtained vehicle operator activity images/videos, and determine a dispenser nozzle color that the vehicle operator 302 may be using to refill the auxiliary tanks 306 from the obtained images/videos. The processor 208 may be further configured to compare the determined color with a stored mapping of dispenser nozzle colors and corresponding fuel types (stored in the dispenser nozzle database 222), and determine the fuel type that the vehicle operator 302 may be refueling. Responsive to determining the fuel type, the processor 208 may determine the auxiliary tank (e.g., a target auxiliary tank such as the auxiliary tank 306c, from the auxiliary tanks 306) that the vehicle operator 302 may be refueling. In some aspects, the processor 208 may fetch auxiliary tank information from the auxiliary tanks database 224, and determine the auxiliary tank that the vehicle operator 302 may be refueling. For example, if the processor 208 determines (from the dispenser nozzle color) that the vehicle operator 302 may be refilling gasoline, and the auxiliary tank information in the auxiliary tank database 224 indicates that the auxiliary tank 306c stores gasoline, the processor 208 may determine that the vehicle operator 302 may be filling gasoline in the auxiliary tank 306c.

In further aspects, the processor 208 may use the auxiliary tank location information stored in the auxiliary tank database 224, and determine the auxiliary tank and the fuel type that the vehicle operator 302 may be refilling. In this aspect, the processor 208 may not be required to determine the dispenser nozzle color to determine the auxiliary tank and/or the fuel type. For example, if the processor 208 determines (from the obtained vehicle operator activity images/videos) that the vehicle operator 302 may be filling an auxiliary tank near a vehicle passenger side, the processor 208 may determine the auxiliary tank, e.g., the auxiliary tank 306c, from the tank location information stored in the auxiliary tank database 224. In addition, the processor may determine the fuel type that is stored in the auxiliary tank 306c from a mapping of liquid type and auxiliary tanks stored in the auxiliary tank database 224.

In accordance with further aspects, when the vehicle operator 302 indicates to refill two auxiliary tanks (such as the auxiliary tank 306a and 306b), the processor 208 may instruct, via the vehicle information system 308, the vehicle operator 302 to refill the tanks one at a time.

Responsive to determining the auxiliary tank, the vehicle weight change (as described in FIG. 2), and the fuel type (as described in FIG. 3), the processor 208 may determine and display a liquid level change in the determined auxiliary tank. The process of determining the liquid level change may be understood in conjunction with FIG. 4.

Figure 4:
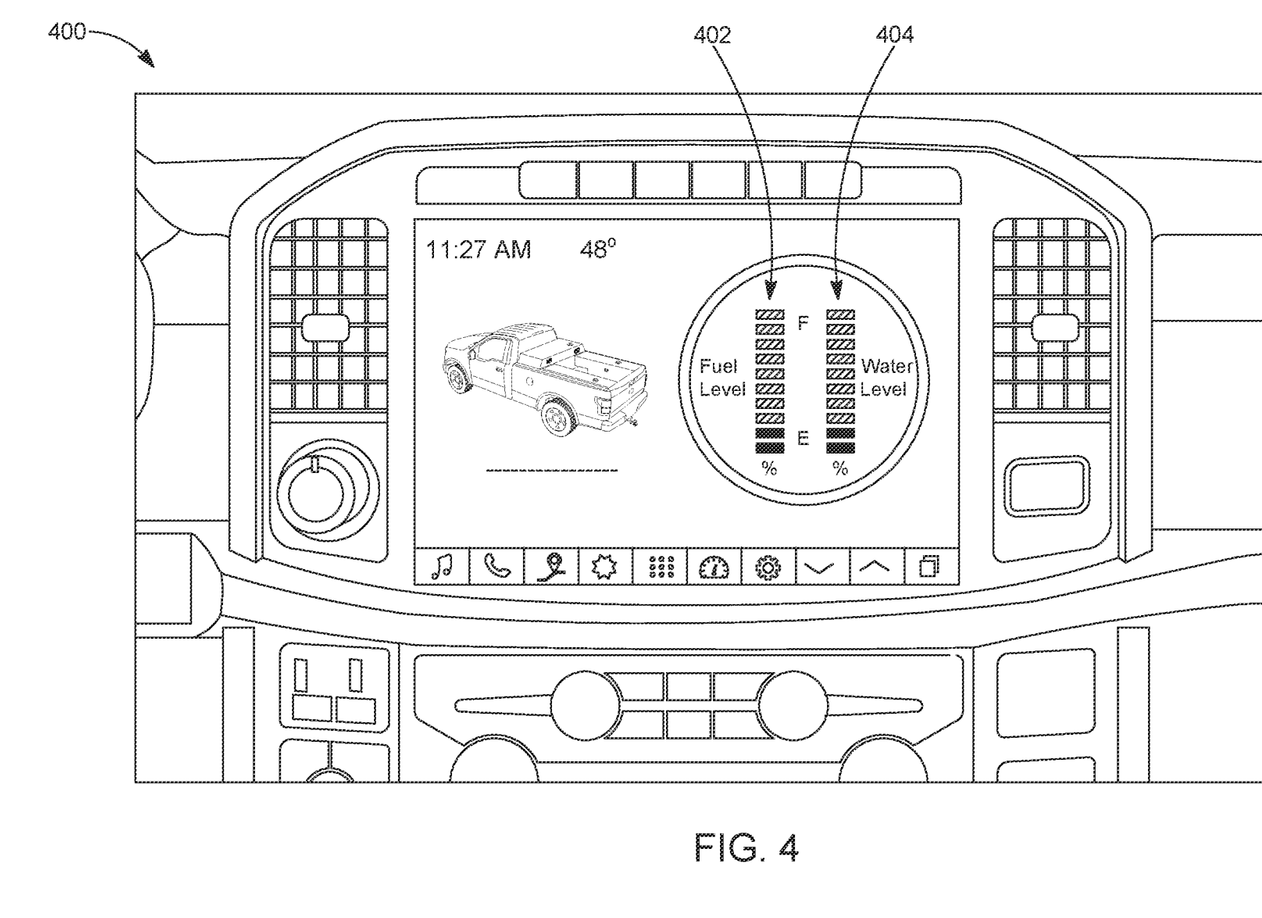
FIG. 4 illustrates an example system to display a measured liquid level, in accordance with the present disclosure.

FIG. 4 illustrates an example system 400 to display a measured liquid level, in accordance with the present disclosure. In some aspect, the system 400 may be an infotainment system 400/HMI display 400 installed in a vehicle (same as the vehicle infotainment system 308). In other aspects, the system 400 may be a user device (e.g., the user device 220) that may display the liquid level of each auxiliary tank via a vehicle application installed on the user device.

In particular, FIG. 4 illustrates liquid levels associated with the plurality of auxiliary tanks 306 on the HMI display 400 (or the vehicle infotainment system 400). For instance, when the processor 208 determines that the vehicle operator 302 may be refilling the auxiliary tank 306c, the corresponding fuel type may be gasoline, and the vehicle weight change may be 62 pounds (lbs.), the processor 208 may display the liquid level change by correlating the vehicle weight change (62 pounds) with gasoline density (e.g., 6.2 lbs./gallon). For example, the processor 208 may determine and display the liquid level change as 10 gallons on the HMI display 400. In some aspects, the fuel density information may be stored in the memory 210, and the processor 208 may fetch the fuel density information from the memory 210 and determine the liquid level change. Furthermore, the processor 208 may fetch the auxiliary tank 306c size/capacity information from the auxiliary tank database 224, to determine and display the liquid level change in percentage. For example, if the auxiliary tank 306c capacity is 50 lbs., the processor 208 may determine and display, on the HMI display 400, that the auxiliary tank 306c is 20% full (shown as a scale 402 in FIG. 4).

In a similar manner, the processor 208 may determine and display liquid levels for the liquids stored in other auxiliary tanks (e.g., the auxiliary tanks 306a and 306b) on the HMI display 400. For example, the processor 208 may display water level in an auxiliary tank (e.g., the auxiliary tank 306b) on the HMI display 400, shown as a scale 404 in FIG. 4.

In some aspects, the processor 208 may display, on the HMI display 400, the liquid level in any form including, but not limited to, a bar chart (vertical or horizontal), pie chart, or any other gauge chart to display the liquid level.

A person ordinarily skilled in the art may appreciate that although the description above describes the embodiments corresponding to the vehicle operator 302 filling the auxiliary tanks, the present disclosure also applies to embodiments when the vehicle operator 302 extracts liquid from the auxiliary tanks. In the latter case, the processor 208 may be configured to display, on the HMI display 400, the drop in the liquid level corresponding to the decrease in the vehicle weight (as determined from the second detection unit 204). For example, the processor 208 may display a drop in water level in the auxiliary tank 306b, when the vehicle operator 302 extracts water from the auxiliary tank 306b. In some aspects, the water level drop may be calculated based on the vehicle weight drop and the water density. For example, if the vehicle weight drops by 42 lbs., the processor 208 may determine and display, on the HMI display 400, that the water level has dropped by five gallons.

In some aspects, the memory 210 may store a mapping of liquid/fuel types with corresponding densities, and the processor 208 may use the stored mapping to determine the change in liquid level, as described above. In other words, the memory 210 may store a lookup table that includes a mapping of "Liquid Type" with "Density" for different liquids. An exemplary lookup table is shown below:

| Liquid Type | Density (English) | Density (Metric) |
| --- | --- | --- |
| Water | 8.3 lbs./gallon | 1 kg/liter |
| Gasoline | 6.2 lbs./gallon | 0.75 kg/liter |
| Light Crude Oil | 7 lbs./gallon | 0.84 kg/liter |
| Nitric Acid (Concentrated) | 12.4 lbs./gallon | 1.5 kg/liter |
| Hydrochloric Acid (Concentrated) | 9.8 lbs./gallon | 1.2 kg/liter |
| Acetic Acid (Glacial) | 8.7 lbs./gallon | 1.1 kg/liter |

Figure 5:
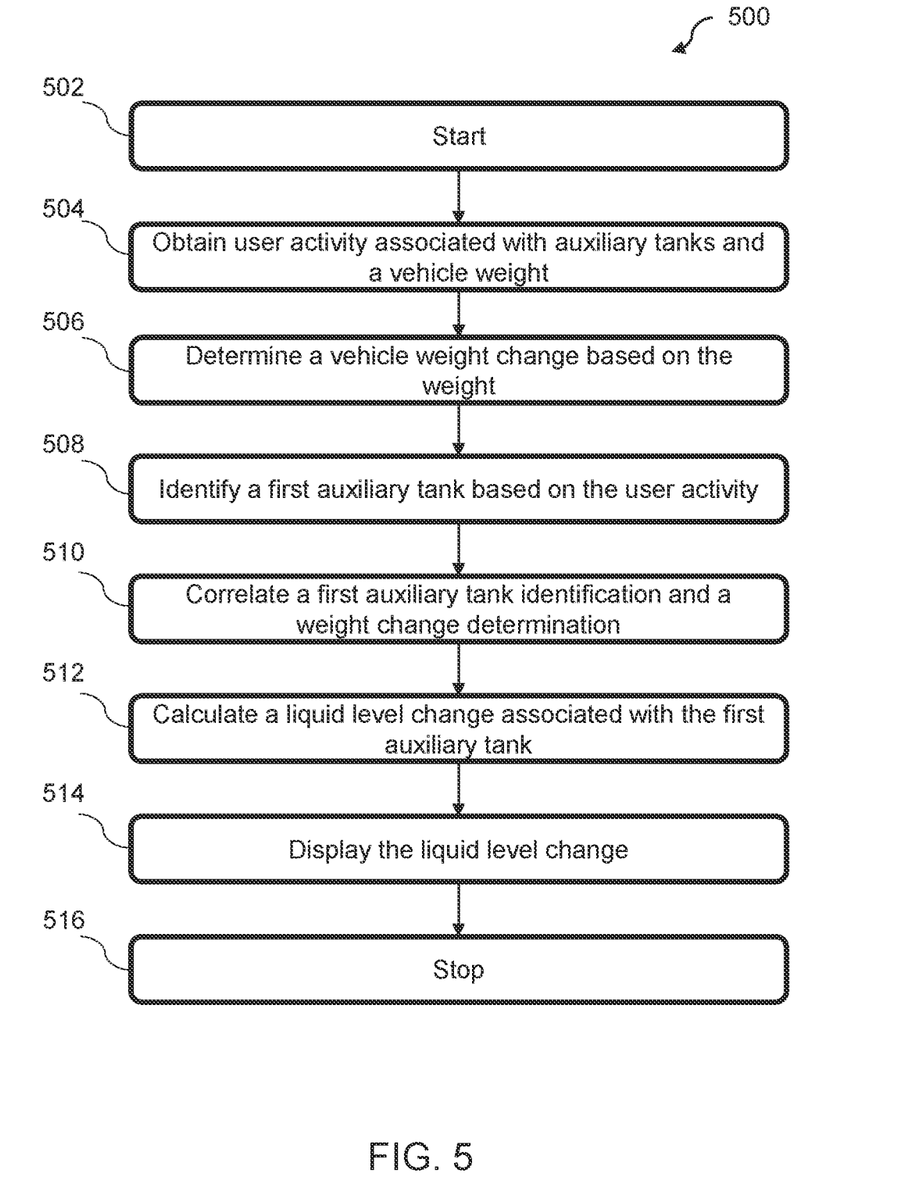
FIG. 5 depicts a flow diagram of an example method for determining and displaying liquid level, in accordance with the present disclosure.

FIG. 5 depicts a flow diagram of an example method 500 for determining and displaying liquid level, in accordance with the present disclosure. FIG. 5 may be described with continued reference to prior figures, including FIGS. 1-4. The following process is exemplary and not confined to the steps described hereafter. Moreover, alternative embodiments may include more or less steps that are shown or described herein and may include these steps in a different order than the order described in the following example embodiments.

Referring to FIG. 5, at step 502, the method 500 may commence. At step 504, the method 500 may include obtaining, by a vehicle processor, user activity associated with a plurality of auxiliary tanks (same as the plurality of auxiliary tanks 102) installed in a vehicle (such as the vehicle 100). In some aspects, a first detection unit (such as the vehicle camera) may capture the user activity in proximity to the auxiliary tanks 102 and may send the captured user activity to the vehicle processor. In addition, the method 500 may include obtaining, at step 504, a vehicle weight as measured by a second detection unit (such as a vehicle on-board weight scale and/or weight sensors). A person ordinary skilled in the art may appreciate that vehicle processor may obtain the user activity and the vehicle weight simultaneously or in any order.

At step 506, the method 500 may include determining, by the vehicle processor, a vehicle weight change based on the obtained weight. The details of determining the vehicle weight change may be understood in conjunction with FIGS. 1-4. At step 508, the method 500 may include identifying a first auxiliary tank, from the plurality of auxiliary tanks, based on the obtained user activity. The details of identifying the first auxiliary tank may be understood in conjunction with FIGS. 1-4. In some aspects, the vehicle processor may trigger the step of the first auxiliary tank identification (e.g., the step 508) when the vehicle processor determines the vehicle weight change. Alternatively, the vehicle processor may trigger the step of vehicle weight change determination (e.g., the step 506) when the vehicle processor identifies the user activity in a proximity to the first auxiliary tank. In further aspects, both the steps 506 and step 508 can takes place simultaneously.

At step 510, the method 500 may include correlating, by the vehicle processor, a first auxiliary tank identification and a weight change determination. Next, at step 512, the method 500 may include calculating, via the vehicle processor, a liquid level change associated with the first auxiliary tank based on the correlation and a first auxiliary tank liquid density. The method 500 may further include displaying the liquid level change responsive to the liquid level calculation, at step 514. The details of these steps may be understood in conjunction with FIGS. 1-4. The method ends at step 516.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
    a plurality of auxiliary tanks configured to store liquid;
    a first detection unit configured to detect a user activity associated with the plurality of auxiliary tanks;
    a second detection unit configured to measure a weight in the vehicle;
    a user interface;
    a control unit communicatively coupled to the first detection unit, the second detection unit, and the user interface, wherein the control unit is configured to:
        determine, using the first detection unit, that the user is proximate to a first auxiliary tank of the plurality of auxiliary tanks;
        activate, based on the user being proximate to the first auxiliary tank, the second detection unit;
        determine, based on the first auxiliary tank, a liquid type associated with the first auxiliary tank;
        determine, using the second detection unit, a current weight in the vehicle;
        determine a weight change in the vehicle based on the current weight and a baseline weight in the vehicle;
        calculate a liquid level change associated with the first auxiliary tank based on the weight change and a density associated with the liquid; and
        display, via the user interface, the liquid level change and the type of liquid.

2. The vehicle of claim 1, wherein the plurality of auxiliary tanks further comprises a second auxiliary tank and a third auxiliary tank.

3. The vehicle of claim 2, wherein the first auxiliary tank, the second auxiliary tank, and the third auxiliary tank are configured to store at least one of a fuel, water, a lubricating oil, and an engine oil.

4. The vehicle of claim 1, wherein the plurality of auxiliary tanks is placed on a vehicle cargo bed.

5. The vehicle of claim 1, wherein the first detection unit is a vehicle camera, and the second detection unit is a vehicle on-board weight scale.

6. The vehicle of claim 1, wherein the plurality of auxiliary tanks further comprise a second auxiliary tank, and wherein the controller is further configured to:
    determine that that both the first auxiliary tank and the second auxiliary tank are to be filled; and
    provide, via the user interface, instructions for sequential filling of the first auxiliary tank and the second auxiliary tank.

7. The vehicle of claim 1, wherein to determine the type of the liquid, the controller is further configured to:
    detect, using the first detection unit, a color of a nozzle being used with the first auxiliary tank; and
    determine, based on the color of the nozzle, the type of the liquid.

8. A method comprising:
    determining, by a control unit and using a first detection unit, that a user is proximate to a first auxiliary tank of a plurality of auxiliary tanks, wherein the plurality of auxiliary tanks is configured to store liquid;
    activating, by the control unit and based on the user being proximate to the first auxiliary tank, a second detection unit;
    determining, by the control unit and based on the first auxiliary tank, a liquid type associated with the first auxiliary tank;
    obtaining, by the control unit, a current weight in the vehicle from the second detection unit;
    determining, by the control unit, a weight change in the vehicle based on the current weight and a baseline weight;
    calculating, by the control unit, a liquid level change associated with the first auxiliary tank based on the current weight and a density associated with the liquid in the first auxiliary tank;
    displaying, by the control unit, the liquid level change and the liquid type on a user interface;
    determining, by the control unit, that the first auxiliary tank and a second auxiliary tank, of the plurality of auxiliary tanks, are to be filled; and
    providing, by the control unit, instructions to the user to sequentially fill the first auxiliary tank and the second auxiliary tank.

9. The method of claim 8, wherein the plurality of auxiliary tanks further comprises a second auxiliary tank and a third auxiliary tank.

10. The method of claim 9, wherein the auxiliary tank, the second auxiliary tank, and the third auxiliary tank are configured to store at least one of a fuel, water, a lubricating oil, and an engine oil.

11. The method of claim 8, wherein the plurality of auxiliary tanks is placed on a vehicle cargo bed.

12. The method of claim 8, wherein the first detection unit is a vehicle camera, and the second detection unit is a vehicle on-board weight scale.

13. A non-transitory computer-readable storage medium in a distributed computing system, the non-transitory computer-readable storage medium having instructions stored thereupon which, when executed by a processor, cause the processor to:
- determine, using a first detection unit, that a user is proximate to a first auxiliary tank of a vehicle, wherein the vehicle includes a plurality of auxiliary tanks configured to store liquids;
- activate, based on the user being proximate to the first auxiliary tank, a second detection unit of the vehicle;
- determine, using the first detection unit, that a nozzle is being used to fill liquid in the first auxiliary tank;
- determine, based on a color of the nozzle, a liquid type associated with the liquid;
- obtain a current weight in a vehicle from the second detection unit;
- determine a weight change in the vehicle based on the current weight and a baseline weight;
- calculate a liquid level change associated with the first auxiliary tank based on the weight change and a density of the liquid; and
- display the liquid level change and the liquid type on a user interface.

14. The non-transitory computer-readable storage medium of claim 13, wherein the plurality of auxiliary tanks further comprises a second auxiliary tank and a third auxiliary tank.

15. The non-transitory computer-readable storage medium of claim 14, wherein the first auxiliary tank, the second auxiliary tank, and the third auxiliary tank are configured to store at least one of a fuel, water, a lubricating oil, and an engine oil.

16. The non-transitory computer-readable storage medium of claim 13, wherein the plurality of auxiliary tanks is placed on a vehicle cargo bed.

17. The non-transitory computer-readable storage medium of claim 13, wherein the first detection unit is a vehicle camera, and the second detection unit is a vehicle on-board weight scale.

18. The non-transitory computer-readable storage medium of claim 13, wherein the plurality of auxiliary tanks further comprises a second auxiliary tank, and wherein the instructions further cause the processor to:
- determine that both the first auxiliary tank and the second auxiliary tank are to be filled; and
- provide, via the user interface, instructions for sequential filling of the first auxiliary tank and the second auxiliary tank.

* * * * *